United States Patent

Tano et al.

Patent Number: 5,828,987
Date of Patent: Oct. 27, 1998

[54] MOVEMENT DETECTING DEVICE

[75] Inventors: Michiyasu Tano, Yokohama; Tsutomu Miyasaka, Tokyo, both of Japan

[73] Assignee: Data Tec Co., Ltd., Japan

[21] Appl. No.: 809,459

[22] PCT Filed: Aug. 28, 1996

[86] PCT No.: PCT/JP96/02407

§ 371 Date: Apr. 22, 1997

§ 102(e) Date: Apr. 22, 1997

[87] PCT Pub. No.: WO97/08514

PCT Pub. Date: Mar. 6, 1997

[30] Foreign Application Priority Data

Aug. 28, 1995 [JP] Japan ..................... 7-242507

[51] Int. Cl.$^6$ .......................... G06F 17/00; G08G 1/0968
[52] U.S. Cl. .......................... 702/150; 701/213; 701/215; 340/988; 342/357
[58] Field of Search .................. 364/566, 449.7, 364/443, 454; 701/216, 215, 213; 340/988, 990; 342/451, 457, 357

[56] References Cited

U.S. PATENT DOCUMENTS 5,367,463  11/1994  Tsuji ........................... 364/449

FOREIGN PATENT DOCUMENTS

| | | |
|---|---|---|
| 63-302317 | 12/1988 | Japan . |
| 2-81794 | 3/1990 | Japan . |
| 3-94289 | 4/1991 | Japan . |
| 5-10774 | 1/1993 | Japan . |
| 5-215564 | 8/1993 | Japan . |
| 6-147910 | 5/1994 | Japan . |
| 7-242508 | 8/1995 | Japan ................ G01S 5/14 |
| 7-239236 | 9/1995 | Japan . |
| 7-286853 | 10/1995 | Japan . |
| 8-225666 | 8/1996 | Japan ................ G01C 21/00 |

*Primary Examiner*—Kamini Shah
*Attorney, Agent, or Firm*—Bachman & LaPointe, P.C.

[57] ABSTRACT

A movement detecting device capable of accurately measuring the position, the speed and the azimuth of a moving object, such as a vehicle, by using GPS signals without applying a particular alteration to the moving object, is purposed. For realizing it, in an arithmetic control section 3, especially in a speed arithmetic processing section 41, an azimuth arithmetic processing section 42 and a position arithmetic processing section 43, data about relationship between the absolute speed, etc. based on the GPS signals and the relative speed, etc. based on an inertia sensor 5 are derived when the GPS signals are normally received, and data about the actual speed and azimuth of the moving object are derived using the foregoing data about the relationship and the relative speed, etc. when the GPS signals are not received.

7 Claims, 11 Drawing Sheets

MOVEMENT DETECTING DEVICE

TECHNICAL FIELD

The present invention relates to a navigation technique for receiving wave signals from GPS (Global Positioning System) satellites so as to detect a position and an advancing direction of a moving object, such as a vehicle or a person and, in particular, to a movement detecting device which is capable of performing the autonomic navigation with high accuracy even in a place where the reception of the waves from the GPS satellites is difficult, such as in a tunnel, among high buildings or under an elevated railroad.

BACKGROUND ART

A movement detecting device has been known which detects in real time the current position and the speed of a moving object by combining a moving amount sensor for detecting a moving amount of the moving object and GPS signals received from GPS satellites, and displays them. The movement detecting device of this type has been used, for example, as a sensor unit for positional data or the like in the car navigation system. The conventional movement detecting device used in the car navigation system includes, for example, a GPS antenna and a GPS receiver for receiving GPS signals from the GPS satellites, a rotation detector of a tire as an example of the moving amount sensor, and an arithmetic unit for calculating the absolute position, the absolute speed and the absolute azimuth of a vehicle based on the GPS signals sent from the GPS receiver as well as the relative speed and the traveled distance of the vehicle based on the revolution speed of the tire measured by the rotation detector, and correcting the absolute position and the like based on the calculation results. The car navigation system prestores map data and displays the calculation result data of the arithmetic unit as superposed on the map.

In the movement detecting device thus structured, since the absolute position, etc. of the vehicle can be derived based on the GPS signals and further the speed and the traveled distance of the vehicle can be derived from the revolution speed of the tire measured by the rotation detector, it is advantageous that the movement data of the vehicle can be detected more accurately than the case where only the GPS or the rotation detector is used.

However, in the conventional movement detecting device, since only the moving amount sensor can work in a place where the GPS signals can not be received, such as among buildings, in a tunnel or in a forest, the accuracy of movement data is relatively lowered. Further, in case of the car navigation system, if the tire idles during the vehicle running or the moving amount sensor idles at a contacting portion with the tire, the measurement results of the moving amount sensor differ from the actual movement data. Further, it is possible that a user can not recognize an occurrence of such a situation. Thus, there have been such occasions where the operation reliability of the movement detecting device is lowered.

Further, when using the movement detecting device in the car navigation system, the standard of signals to be used in the rotation detector as the moving amount sensor is not offered as the standard for all the vehicles. For example, when the shapes or the sizes of the tires or the mounting portions are different, a difference is caused in measurement results. Accordingly, there has been a problem that it is essential upon installing the system to alter the vehicle so as to match the signal standard of the rotation detector or calibrate the rotation detector per vehicle and thus the system installation cost can not be lowered.

DISCLOSURE OF INVENTION

For achieving the foregoing object, the present invention provides a movement detecting device comprising GPS arithmetic means for producing first movement data based on GPS signals, the first movement data including variation components of an absolute position, an absolute speed and an absolute azimuth of a moving object; an inertia sensor for detecting an acceleration generated in a traveling direction of the moving object and an angular velocity generated about an axis having a fixed inclination relative to the traveling direction; means for producing second movement data from the acceleration and the angular velocity measured by the inertia sensor, the second movement data including variation components of a relative position, a relative speed and a relative azimuth of the moving object; and arithmetic control means for correcting the first and second movement data based on the mutual data and producing actual movement data including an actual position, an actual speed and an actual azimuth of the moving object through calculation.

The arithmetic control means, for example, holds calculation result data generated when the GPS signals are normally received, while derives the actual movement data of the moving object using the held calculation result data when the reception of the GPS signals is not possible. The arithmetic control means comprises centrifugal force correction means for correcting an influence of a centrifugal force relative to the actual speed based on the actual speed and the angular velocity data, and correction means for deriving errors due to a drift of the inertia sensor from a difference between the absolute speed and the relative speed and a difference between the absolute azimuth and the relative azimuth, respectively, and correcting the relative speed and the relative azimuth based on the derived errors, respectively.

Specifically, the arithmetic control means includes a speed arithmetic processing section, an azimuth arithmetic processing section and a position arithmetic processing section.

(1) The speed arithmetic processing section includes the following elements:

(1-1) means for deriving a first motion acceleration from a variation of a combined speed obtained through a filter combination of the absolute speed and the relative speed;

(1-2) means for deriving a first gravitational acceleration by subtracting the first motion acceleration from acceleration data;

(1-3) means for converting angular data obtained by integrating angular velocity data into a second gravitational acceleration;

(1-4) means for converting a third gravitational acceleration obtained through a filter combination of the first and second gravitational accelerations into a fourth gravitational acceleration based on a reference inclination;

(1-5) means for deriving an error between the first gravitational acceleration and the fourth gravitational acceleration; and (1-6) means for correcting the second gravitational acceleration by the error, deriving a second motion acceleration by subtracting a gravitational acceleration after the correction from the acceleration data, and deriving an actual speed by integrating the second motion acceleration.

The filter combination of the absolute speed and the relative speed and the filter combination of the first and second gravitational accelerations are each in the form of a combination of values after passing through two kinds of filters having different frequency bands.

(2) The azimuth arithmetic processing section includes the following elements:

(2-1) means for deriving a combined relative azimuth through a filter combination of a variation per unit time of the absolute azimuth and the relative azimuth; and (2-2) means for selectively outputting one of a first actual azimuth obtained by summing the combined relative azimuth derived based on the sequentially updated absolute azimuth and relative azimuth and the absolute azimuth, and a second actual azimuth obtained by summing the relative azimuth and the first actual azimuth.

The filter combination of the variation per unit time of the absolute azimuth and the relative azimuth is in the form of a combination of values after passing through two kinds of filters having different frequency bands.

(3) The position arithmetic processing section includes the following elements:

(3-1) means for deriving a moved distance by integrating the actual speed, and deriving a latitude variation value and a longitude variation value based on the moved distance and the actual azimuth; and (3-2) means for producing the actual position by correcting the sequentially updated absolute position during its non-updated term using the latitude variation value and the longitude variation value.

By arranging the arithmetic control means as described above, the data about the position, speed and azimuth, etc. of the moving object can be acquired correctly irrespective of a kind of the moving object or a moving condition, for example, whether moving in a place where the GPS signals can not be received.

BEST MODE FOR CARRYING OUT THE INVENTION

Figure 1:
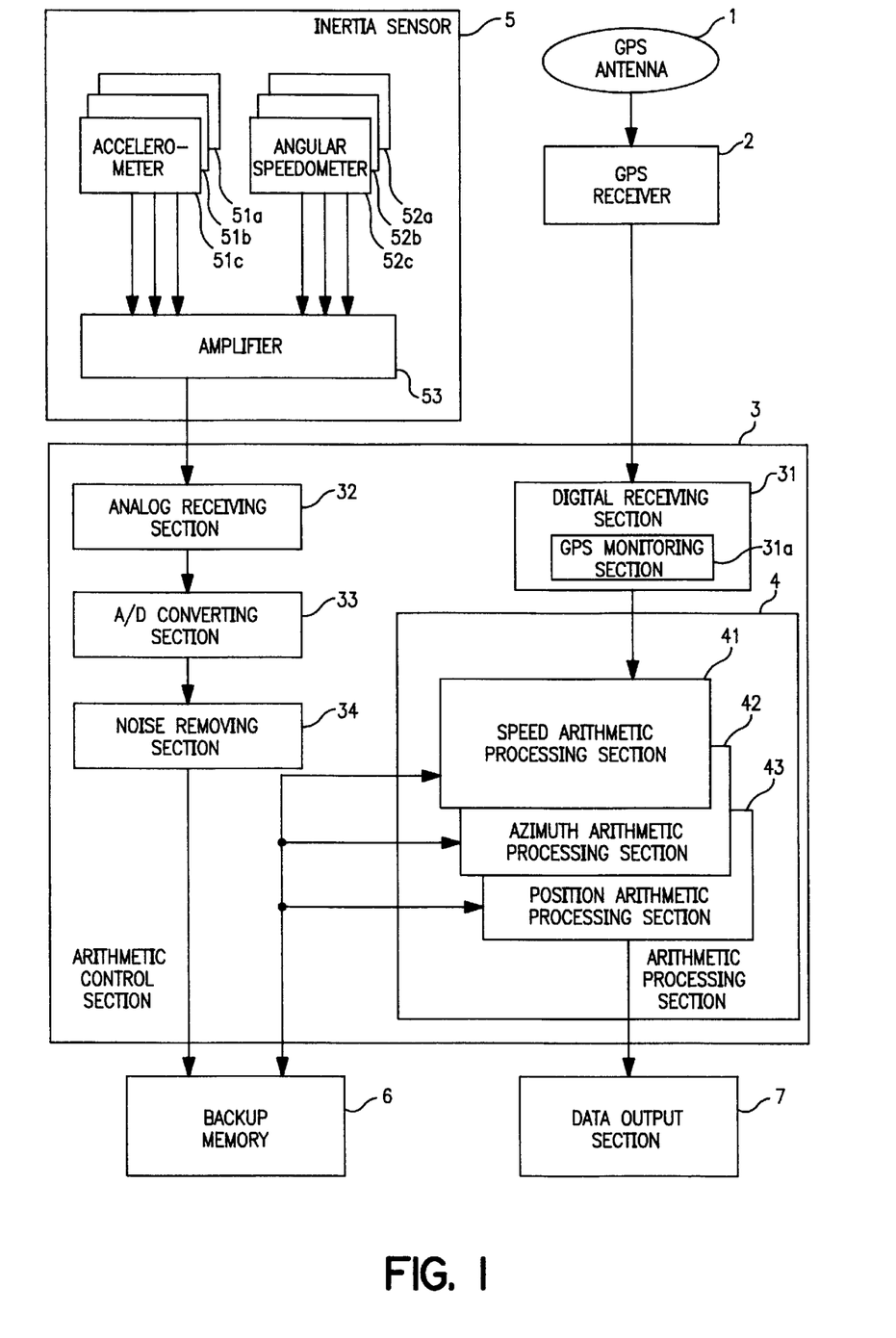
FIG. 1 is a diagram showing a structural example of a movement detecting device of the present invention.

FIG. 1 is a structural diagram showing an embodiment of a movement detecting device of the present invention.

The movement detecting device includes a GPS receiver 2 for converting GPS signals received at a GPS antenna 1 into serial digital data, such as positional data in the form of latitude and longitude, and data representing the absolute speed and the absolute azimuth, which can be used in the autonomic navigation, and outputting them, an arithmetic control section 3, an inertia sensor 5, a backup memory 6 achieving the backup through the continuous feeding, and a data output section 7.

The arithmetic control section 3 includes a digital receiving section 31 for receiving the serial data from the GPS receiver 2 so as to convert them into parallel data, an analog receiving section 32 for receiving analog data from the inertia sensor 5, an analog/digital converting section (A/D converting section) 33 for converting the analog data into digital data, a noise removing section 34 for removing noise components of the digital data, and an arithmetic processing section 4 for calculating the actual speed, the actual azimuth and the actual position of a moving object. The digital receiving section 31 includes a GPS monitoring section 31a for determining whether the GPS signal is normally received or not, by judging presence or absence of a status signal contained in the GPS signal and presence or absence of updating of the GPS signal. The monitoring results of the GPS monitoring section 31a are sent to the arithmetic processing section 4.

The inertia sensor 5 measures accelerations and angular velocities generated with respect to the three-dimensional axes (X-, Y- and Z-axes) which are set relative to the moving object. For example, the inertia sensor 5 includes three accelerometers 51a–51c, three angular speedometers 52a–52c, and an amplifier 53 for amplifying the measurement results thereof. It is preferable that these instruments are arranged on the three axes which are precisely orthogonal to each other. However, if the three axes are not precisely orthogonal to each other or if the three axes which are oblique to each other are set relative to the moving object, the measured values can be corrected using proper parameters. On the other hand, since it is sufficient to measure the acceleration produced in an advancing direction of the moving object and the angular velocities produced about the axes each having a fixed inclination relative to the advancing direction, at least one accelerometer and at least two angular speedometers are required.

The measurement results amplified by the amplifier 53 are fed to the A/D converting section 33 via the analog receiving section 32 so as to be converted into digital signals adapted for the arithmetic processing in the arithmetic processing section 4. Then, the noise components thereof are removed through the noise removing section 34 and the resultant digital signals are stored in the backup memory 6 so as to be updatable in sequence.

The arithmetic processing section 4 in the arithmetic control section 3 is in the form of a programmed digital processor for reading out the data stored in the backup memory 6 at the given timing so as to calculate data about the actual speed, the actual azimuth and the actual position of the moving object and further storing the arithmetic processing results in the backup memory 6 properly.

Figure 2:
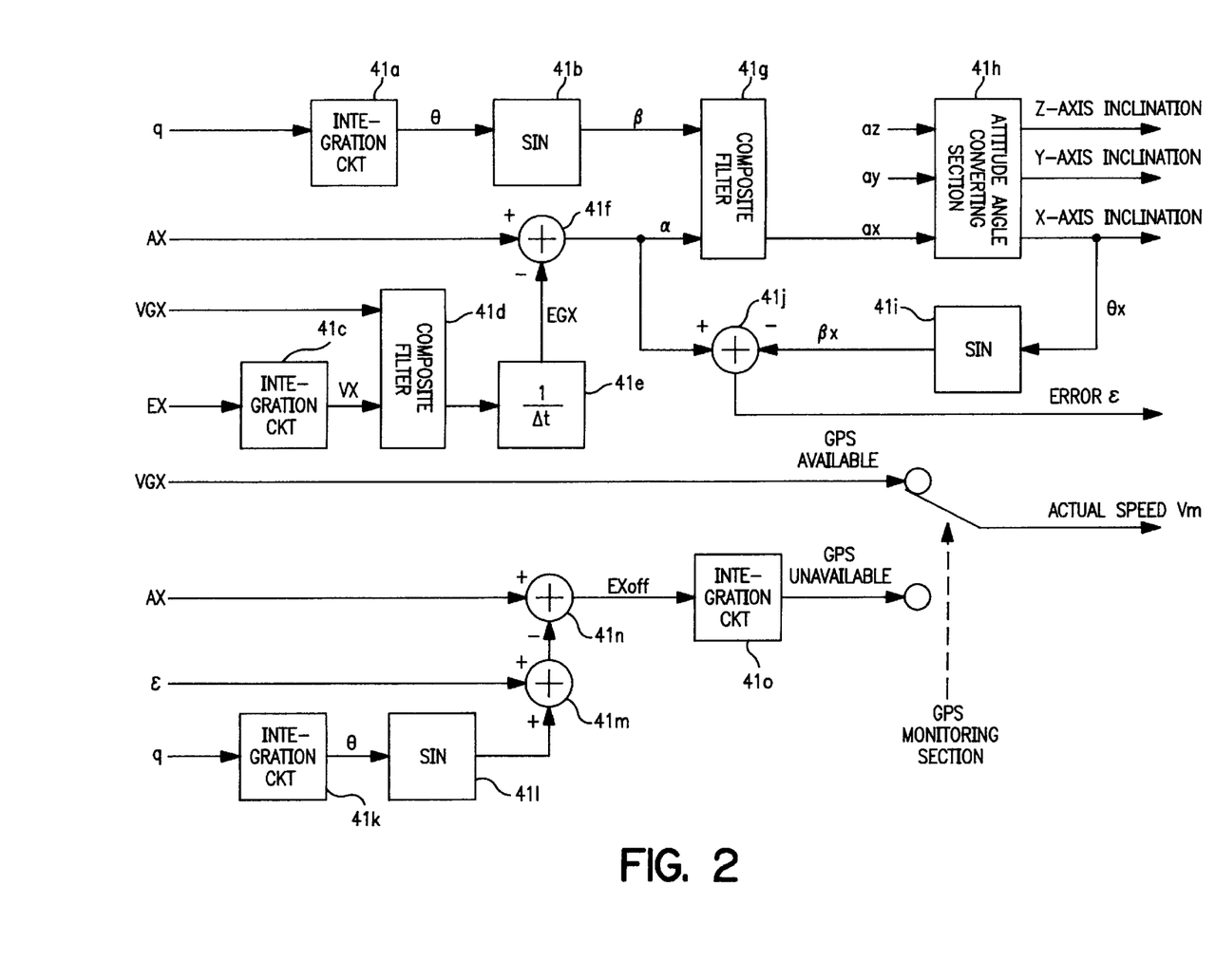
FIG. 2 is a functional block diagram of a speed arithmetic processing section.
Figure 3:
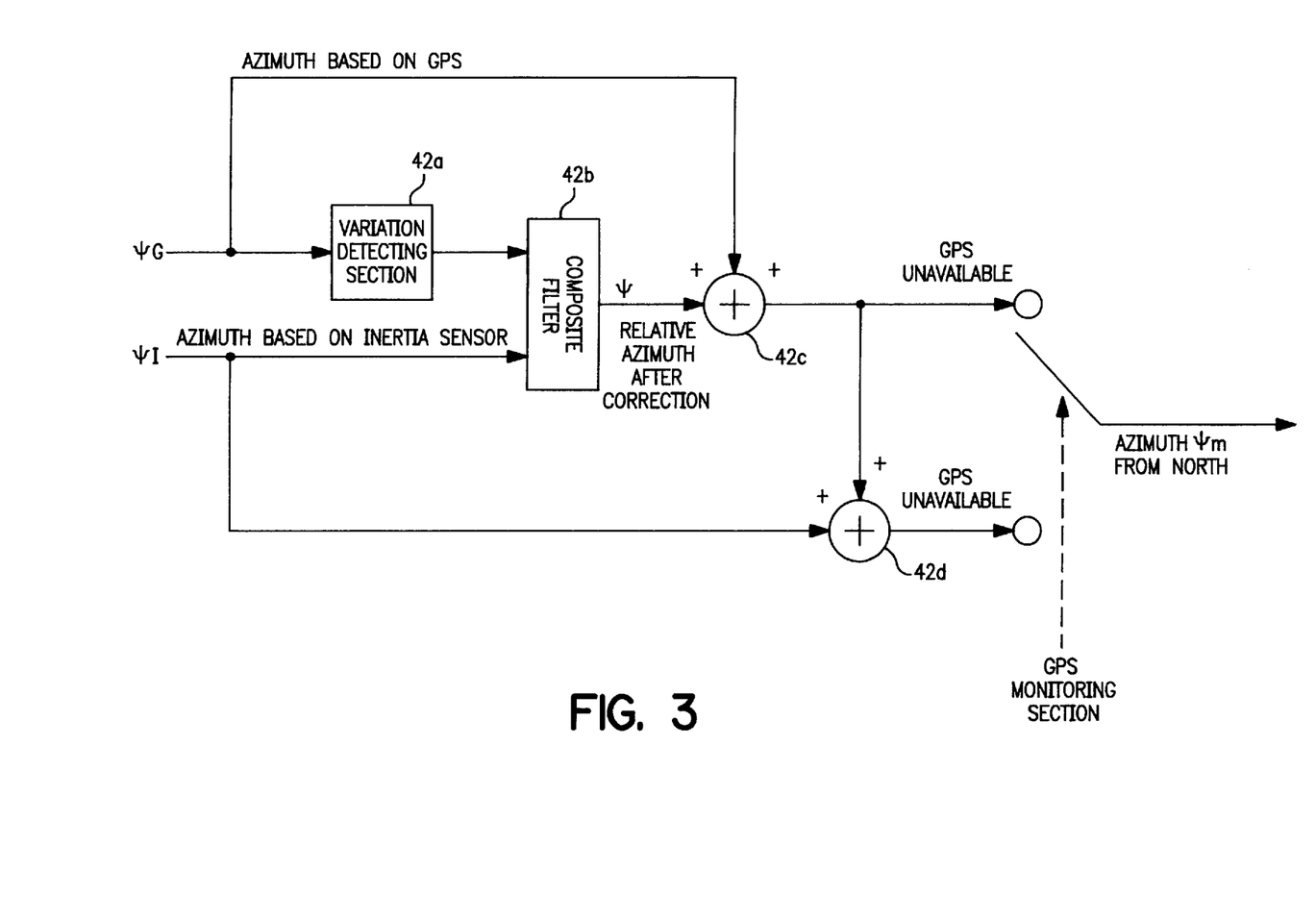
FIG. 3 is a functional block diagram of an azimuth arithmetic processing section.
Figure 4:
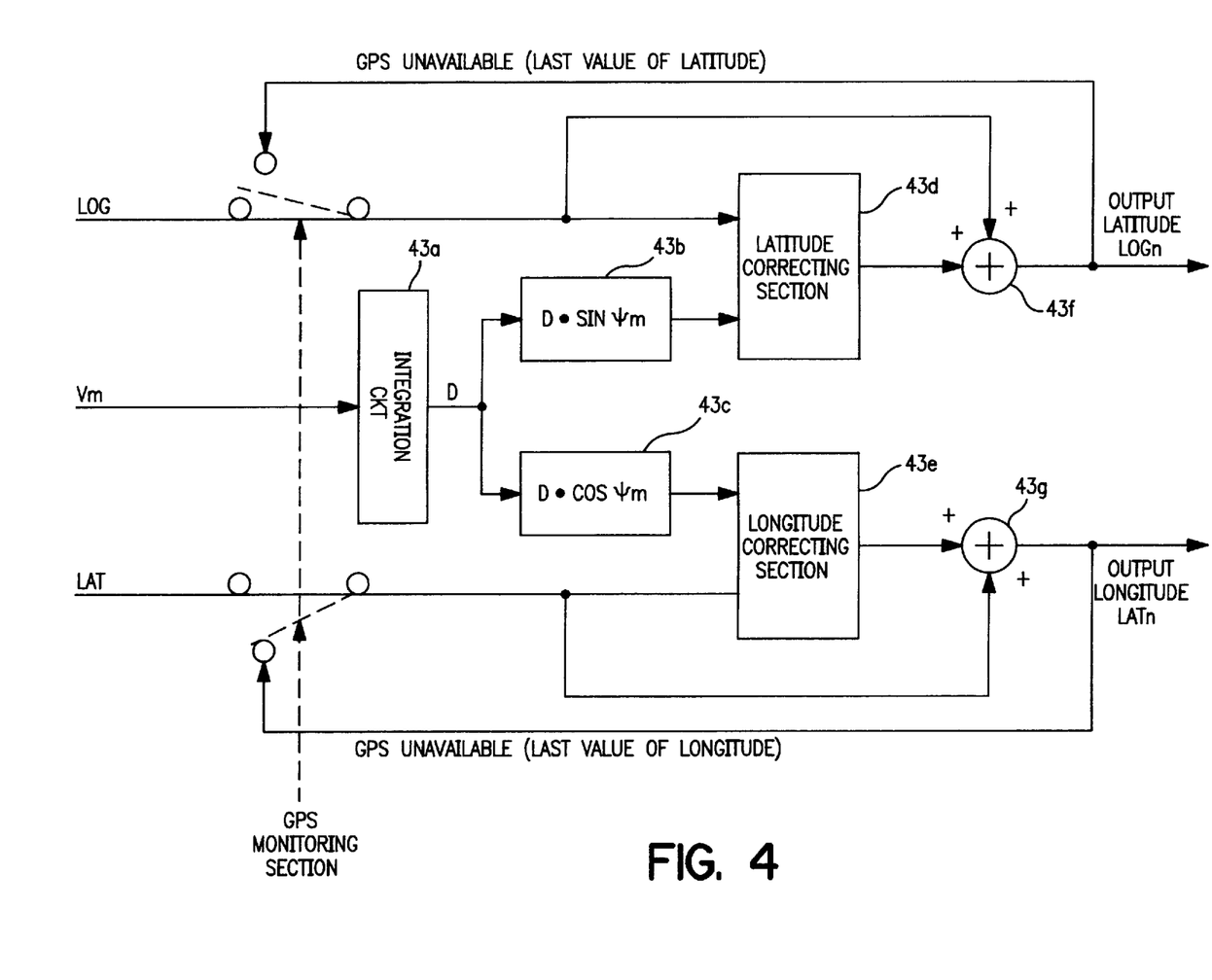
FIG. 4 is a functional block diagram of a position arithmetic processing section.

For convenience, the calculation of the speed is performed by a speed arithmetic processing section 41 having a structure shown in FIG. 2, the calculation of the azimuth is performed by an azimuth arithmetic processing section 42 having a structure shown in FIG. 3, and the calculation of the position is performed by a position arithmetic processing section 43 having a structure shown in FIG. 4. The data output section 18 outputs the output data of the arithmetic control section 3 to a display unit or a subsequent processing section.

Figure 5:
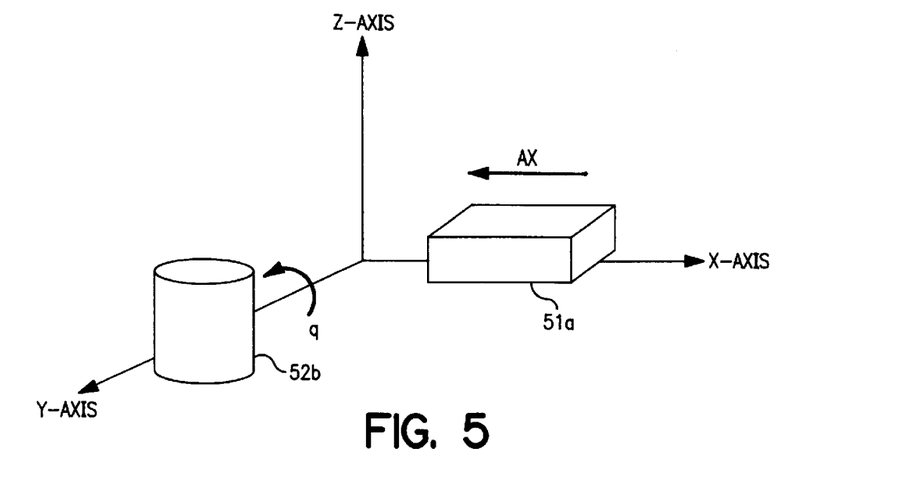
FIG. 5 is a diagram showing a relationship between directions of three axes orthogonal to each other and an advancing direction of a moving object.

Now, operations of the sections in the movement detecting device will be described in detail when deriving the actual speed, the actual azimuth and the actual position of the moving object, on the assumption that, as shown in FIG. 5, an advancing direction of the moving object is set to the X-axis, a direction orthogonal to the advancing direction of the moving object on the plane including the advancing direction of the moving object is set to the Y-axis, and a direction perpendicular to the plane defined by the X- and Y-axes is set to the Z-axis.

(1) Actual Speed of Moving Object

Figure 6A:
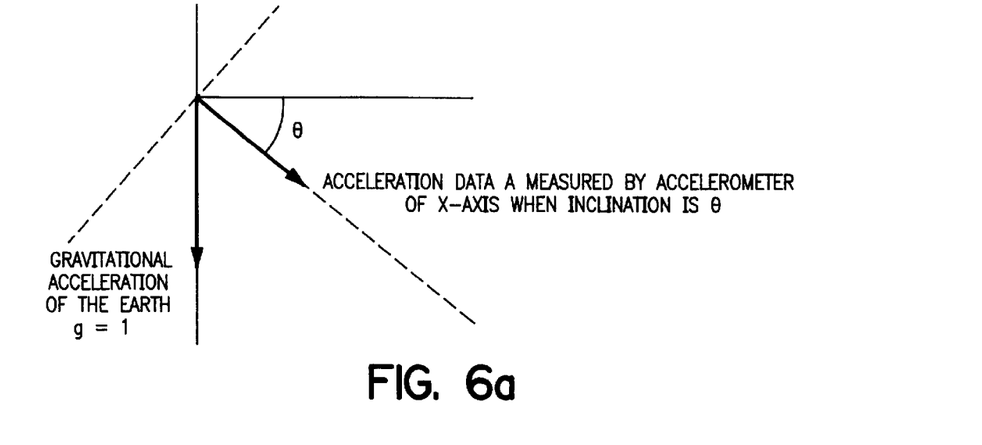
FIGS. 6(a) and FIG. 6(b) are explanatory diagrams showing a relationship between a motion acceleration and a gravitational acceleration contained in acceleration data.
Figure 6B:
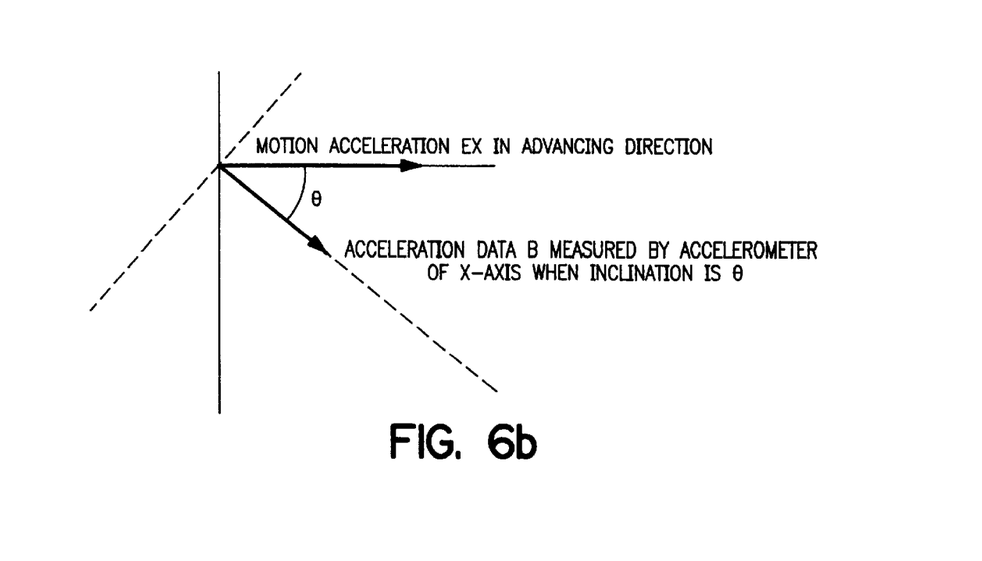

When the moving object is advancing in a certain direction, the acceleration data measured by the accelerometer 51a–51c includes, as shown in FIGS. 6(*a*) and (*b*), a gravitational acceleration g(=A/sinθ) caused by an attitude angle (inclination relative to the reference axis) of the moving object and a motion acceleration EX(=B/cosθ) caused by the actual speed of the moving object in the advancing direction. Accordingly, the acceleration data reveals a combined value of acceleration data A(=g·sinθ) shown in FIG. 6(*a*) and acceleration data B(=EX·cosθ) shown in FIG. 6(*b*). In this case, the speed of the moving object along the X-axis can be derived by extracting only the motion acceleration EX from the acceleration data (A+B) as being the output data of the accelerometer 51a–51c. The angular velocity data as being the output data of the angular speedometer is mainly used for deriving an inclination (θ) for excluding the gravitational acceleration.

An operation of the speed arithmetic processing section 41 according to this principle will be described with reference to FIG. 2. For convenience, an explanation will be made only about the X-axis, which, however, can be similarly applied to the Y- or Z-axis.

First, an error ε is derived when the normal reception of the GPS signals is possible.

It is assumed that the absolute speed in the advancing direction (X-axis direction) derived based on the GPS signals is set to VGX, the acceleration data in the X-axis direction measured by the accelerometer 51a is set to AX, the angular velocity data about the Y-axis measured by the angular speedometer 52b is set to q, and the inclination of the X-axis relative to the horizontal plane is set to θ.

Figure 7:
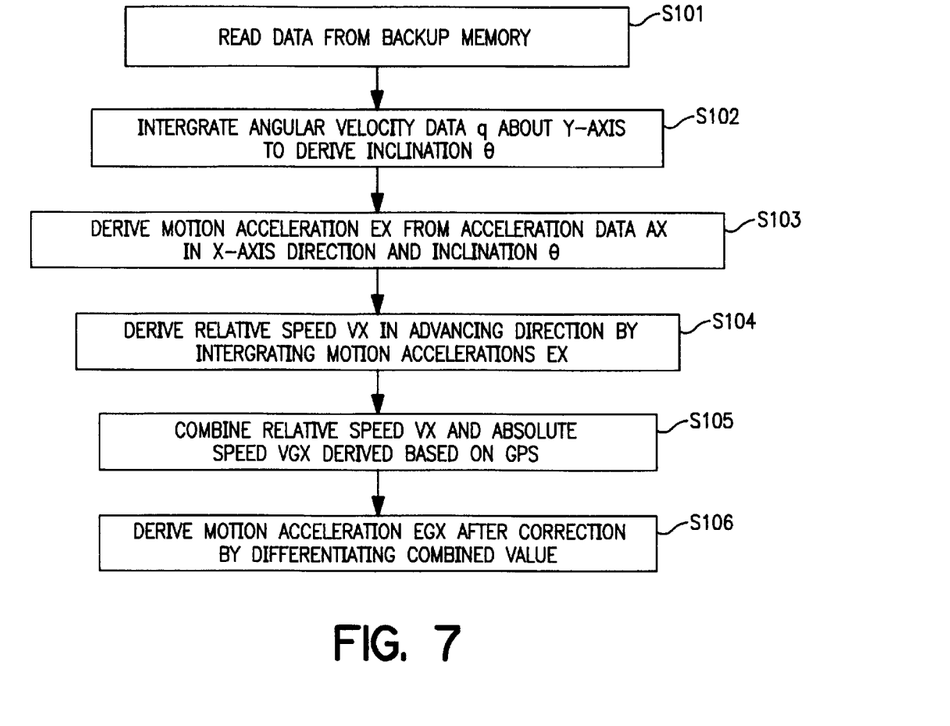
FIG. 7 is an explanatory diagram of a procedure for producing a correct motion acceleration taking an influence of GPS signals into consideration.

As shown in FIG. 7, the speed arithmetic processing section 41 first reads out acceleration data AX stored in the backup memory 6 after a lapse of a given delay time determined for matching a phase with the GPS signals (S101), and derives an inclination θ of the X-axis relative to the horizontal direction (S102). Further, a gravitational acceleration β of high frequencies (short periods) is derived. The inclination θ can be derived through definite integration of the angular velocities q about the Y-axis per period Δt at the integration circuit 41a. The gravitational acceleration β can be derived through calculation of the inclination θ at a sin functional circuit 41b (it is set that the gravitational acceleration g of the earth is 1). Thereafter, a motion acceleration EX in the X-axis direction is derived from the acceleration data AX and the foregoing inclination θ (S103). The motion acceleration EX can be derived through calculation of the following equation (1) as seen from FIGS. 6(*a*) and (*b*):

$$EX=(AX-\sin\theta)\times 1\cos\theta \qquad (1)$$

The speed arithmetic processing section 41 combines, through a composite filter 41d, a relative speed VX derived through definite integration of the motion accelerations EX per period Δt at an integration circuit 41c and an absolute speed VGX derived based on the GPS signals (S104 and S105). Specifically, the absolute speed VGX derived from the GPS signals is updated per unit time, for example, per second, and thus supplemented by the relative speed VX until the next updating. The absolute speed VGX and the relative speed VX pass through a low-pass filter and a high-pass filter, respectively, and are combined to produce the combined speed such that the absolute speed VGX is used for the speed change of the low-frequency (long-period) components and the relative speed VX is used for the speed change of the high-frequency (short-period) components. Then, the thus produced combined speed is differentiated by the foregoing period Δt to derive a correct motion acceleration EGX taking the GPS into consideration (S106).

Figure 8:
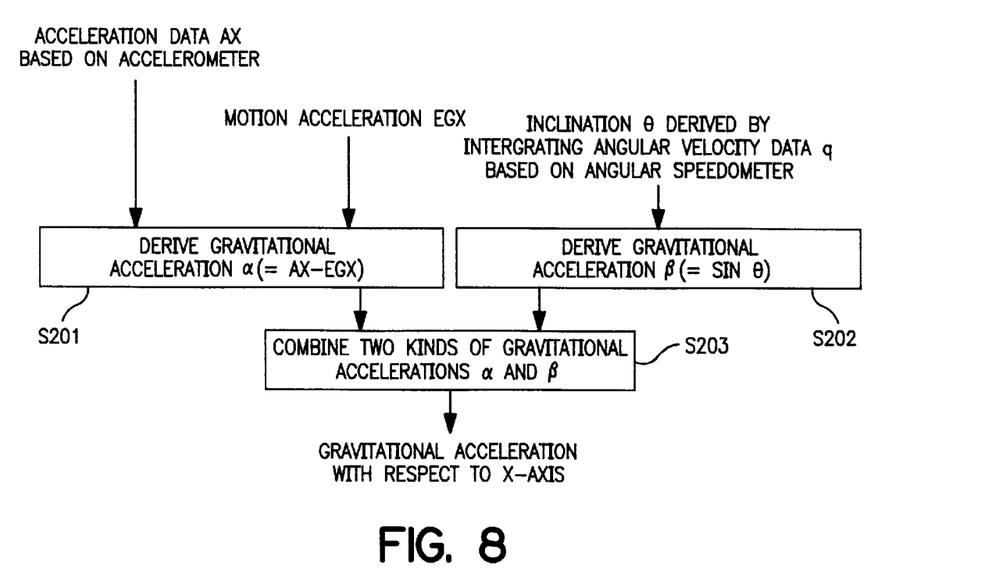
FIG. 8 is an explanatory diagram showing a procedure for combining two kinds of gravitational accelerations.

Next, as shown in FIG. 8, a gravitational acceleration α of low frequencies (long periods) is derived by subtracting the motion acceleration EGX from the acceleration data AX at a subtracter 41f (S201), and the foregoing gravitational acceleration β of high frequencies (short periods) is obtained (S202). Then, the respective gravitational accelerations α and β are combined through a composite filter 41g so as to derive a combined gravitational acceleration ax with respect to the X-axis (S203). Conversion of the combined gravitational acceleration ax, for example, to the Eulerial coordinate system is performed at an attitude angle converting section 41h to derive an attitude angle, that is, an inclination (here given by θx), of the X-axis relative to the reference axis.

Figure 9:
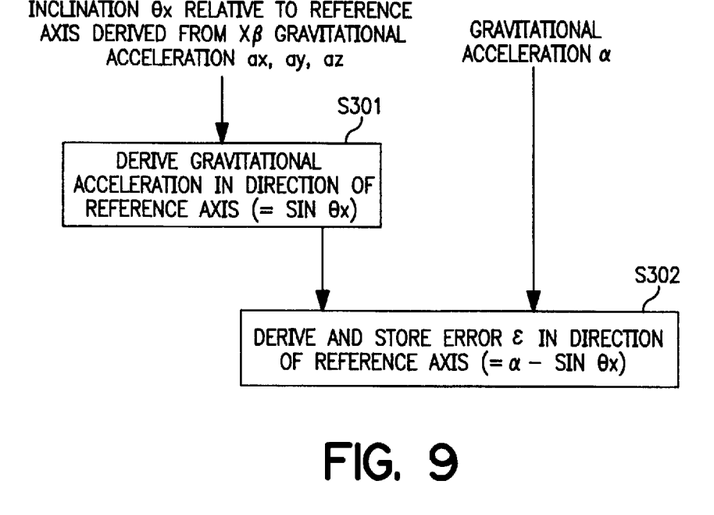
FIG. 9 is an explanatory diagram showing a calculation process of an error in a direction of a reference axis.

Further, as shown in FIG. 9, the foregoing inclination Ox is fed to a sin functional circuit 41i to derive a gravitational acceleration βx (S301), and this gravitational acceleration βx and the foregoing gravitational acceleration α are inputted into a subtracter 41j so as to derive a difference therebetween. Then, this difference is stored in the backup memory 6 as an error ε(=α−βx)(S302). The foregoing error derivation can also be performed in the Y- or Z-axis direction in the same manner.

Figure 10:
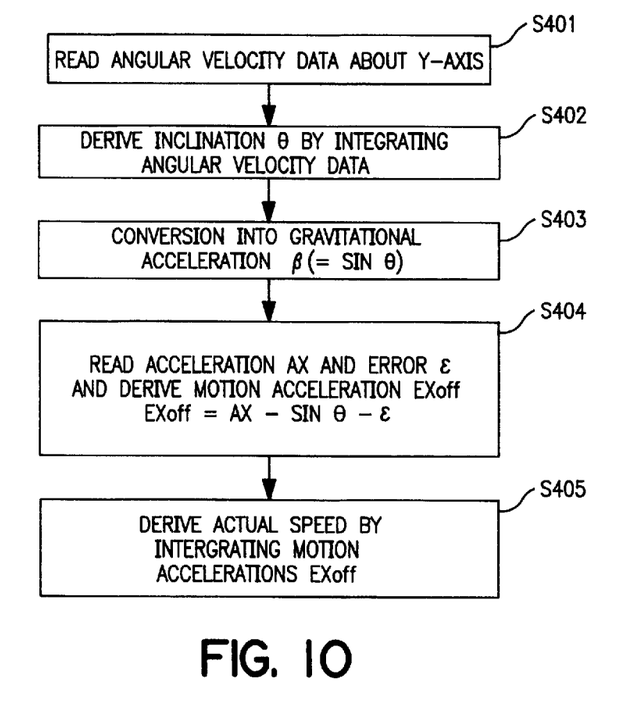
FIG. 10 is an explanatory diagram of a procedure for calculating the actual speed when the GPS signals are not obtained.

Now, a procedure for calculating the actual speed when the GPS signals can not be obtained will be described with reference to FIG. 10. Although explanation will be made about a procedure for calculating the actual speed in the X-axis direction, it can be similarly applied for the actual speed in the Y- or Z-axis direction.

The speed arithmetic processing section 41 reads out the angular velocity data q about the Y-axis, measured at the inertia sensor 5, from the backup memory 6 at the foregoing timing (S401), and derives an inclination θ of the X-axis relative to the horizontal direction by integrating the angular velocity data q at an integration circuit 41k (S402). Then, the inclination θ is fed to a sin functional circuit 41l for conversion into a gravitational acceleration β=sinθ(S403). Subsequently, by subtracting the gravitational acceleration β and the foregoing error ε from the acceleration data AX in the X-axis direction through an adder 41*m* and a subtracter 41*n*, a motion acceleration EXoff in the X-axis direction is derived (S404) and further, by integrating the motion accelerations EXoff through an integration circuit 41*o*, an actual speed Vm is derived (S405).

On the other hand, when the GPS signals are normally received, it may be arranged to use the absolute speed VGX derived at the GPS receiver 2 as the actual speed Vm as it is, or derive the actual speed Vm by integrating the foregoing correct motion accelerations EGX. In FIG. 2, the former is adopted.

When the normal reception of the GPS signals becomes disabled, output data is switched to the integration circuit 41*o*. This switching is performed based on the monitoring results of the GPS monitoring section 31*a* in the digital receiving section 31.

(2) Azimuth of Moving Object

Now, an operation of the azimuth arithmetic processing section 42 will be described with reference to FIG. 3.

When the GPS signals are normally received, the azimuth arithmetic processing section 42 detects, at a variation detecting section 42*a*, a variation component, per unit time, of absolute azimuths ψG (angles relative to the axis of the earth) derived based on the GPS signals. The absolute azimuth ψG is updated per unit time, such as per second, while the reception of the GPS signals is possible. On the other hand, an azimuth ψI as a variation from the last cycle is derived based on the acceleration data and the angular velocity data measured at the inertia sensor 5. It is assumed that, with respect to the absolute azimuth ψG, the n-th derived current absolute azimuth is given by ψG(n), the last absolute azimuth is given by ψG (n−1), and a difference therebetween is given by ΔψG=ψG(n)−ψG(n−1). ΔψG and ψI are combined through a composite filter 42*b* such that low frequencies (long periods) represent ΔψG and high frequencies (short periods) represent ψI, so as to derive a relative azimuthψ. The relative azimuth ψ is added to the current absolute azimuth ψG at an adder 41*c* so that an actual azimuth ψm given by the following equation (2) is outputted:

$$\psi m = \psi m + \psi I \qquad (2)$$

On the other hand, when the reception of the GPS signals is not possible, the azimuth arithmetic processing section 42 outputs an actual azimuth ψm given by the following equation (3):

$$\psi m = \psi m + \psi I \qquad (3)$$

Specifically, the current actual azimuth ψm is derived by adding the sequentially updated relative azimuth ψI to the last actual azimuth ψm.

(3) Position of Moving Object

Now, an operation of the position arithmetic processing section 43 will be described with reference to FIG. 4.

When the GPS signals are normally received, the position arithmetic processing section 43 derives a moved distance D by integrating the foregoing actual speeds Vm at an integration circuit 43*a* per period Δt, and inputs the moved distance D and the foregoing azimuth ψm into a sin functional circuit 43*b* and a cos functional circuit 43*c*. On the other hand, positional data, including a latitude LOG and a longitude LAT, updated per unit time (one second) are inputted into a latitude correcting section 43*d* and a longitude correcting section 43*e*, respectively, from the GPS signals. Until the next updating, the latitude correcting section 43*d* and the longitude correcting section 43*e* perform the correction based on the azimuths ψm and the moved distances D. Specifically, given that a radius of the earth is R, the current latitude LOG(n) and the current longitude LAT(n) are derived by the following equations (4) using the last latitude LOG(n−1) and the last longitude LAT (n−1):

$$LOG(n)LOG(n-1)+(D\times\cos\psi m)\times 1/\{2\pi R\times\cos(LOG(n-1))\}LAT(n)=\\LAT(n-1)+(D\times\sin\psi m)\times 1/\{2\pi R\times\cos(LOG(n-1))\} \qquad (4)$$

On the other hand, since the moved distance D and the azimuth ψm are derived in the foregoing manner even when the normal reception of the GPS signals is not possible, the current latitude LOG(n) and longitude LAT(n) can be derived from the last latitude and longitude. The derived latitudes and longitudes are stored in the backup memory 6 in sequence.

As described above, according to this embodiment, the data about the speed Vm, the location LOGn, LATn and the azimuth ψm of the moving object can be obtained from the backup memory 6 at any time. Further, according to the purpose, arbitrary data can be selectively extracted from those data. Further, even if the power is off, the backup memory 6 can read out and use the last data.

For explaining the movement detecting device of the present invention in more detail, an example will be shown wherein the movement detecting device is used, like the conventional device, in the car navigation system which derives vehicle speed data and azimuth data and visualizes the movement data of the subject vehicle.

Figure 11:
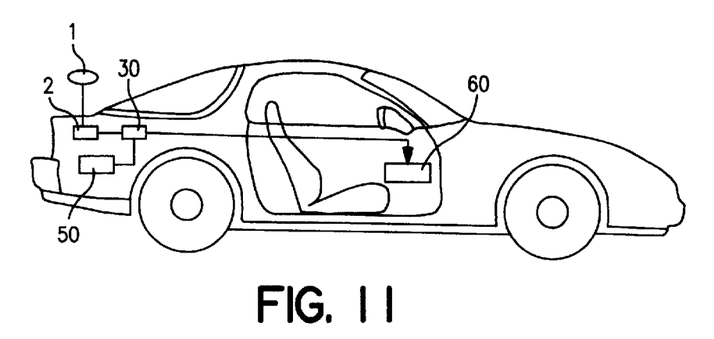
FIG. 11 is a using state explanatory diagram of a movement detecting device according to one embodiment of the present invention.

FIG. 11 is an explanatory diagram showing a mounting state of the movement detecting device in the vehicle. The movement detecting device in this embodiment includes a GPS antenna 1, a GPS receiver 2, an arithmetic control section 30 and an inertia sensor section 50. The speed data and the azimuth data derived at the arithmetic control section 30 are outputted to a car navigation system 60 installed, for example, at the driver's seat.

Figure 12:
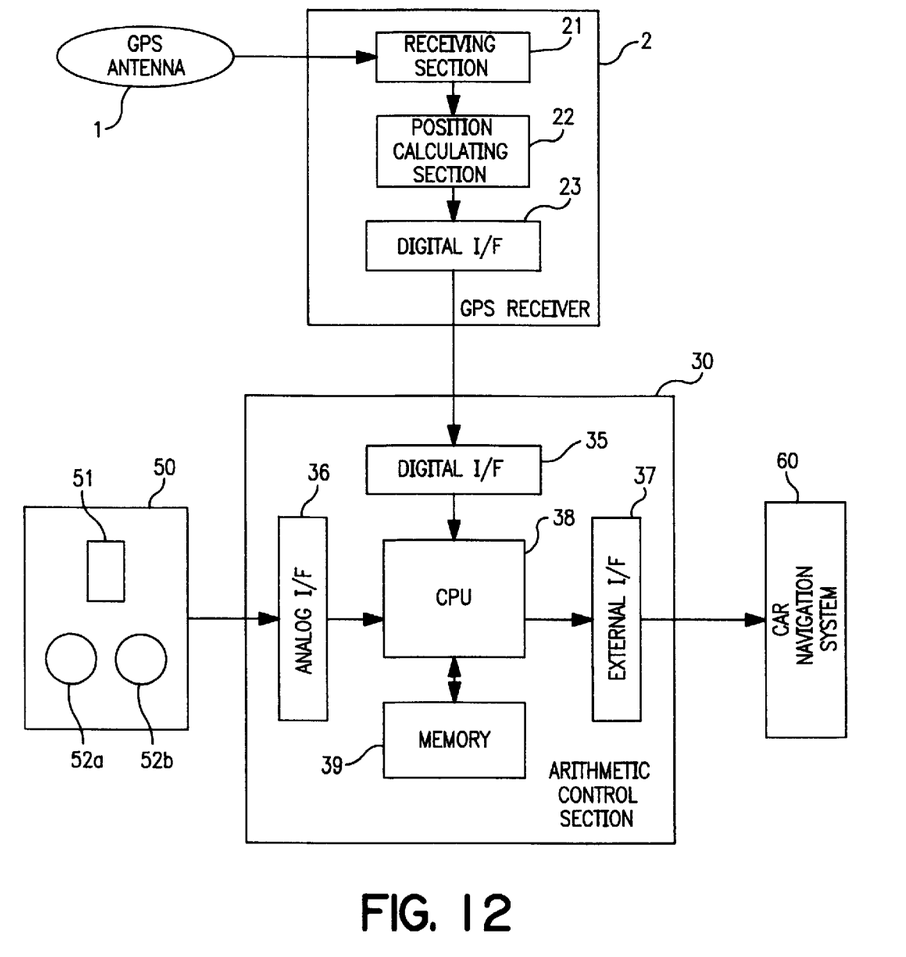
FIG. 12 is a structural diagram of the movement detecting device according to this embodiment.

The GPS antenna 1 catches GPS signals containing constant-orbital signals and signal-transmitting time signals transmitted from GPS satellites (not shown). The caught GPS signal is sent to the GPS receiver 2 via an antenna cord. The GPS receiver 2 includes a receiving section 21, a position calculating section 22 and a digital I/F 23. The GPS receiver 2 samples the GPS signals, caught at the GPS antenna 1, per unit time, such as per second, derives the absolute data including the absolute speed and the absolute azimuth of the vehicle from a change in position per unit time, and outputs the absolute data to the arithmetic control section 30 via the digital I/F 23. The digital I/F 23 is, for example, an RS232C interface.

In general, the position measurement accuracy (positional accuracy) of the GPS is low in the CA mode open to the public and includes an error of about 100 m. On the other hand, the GPS receiver 2 is capable of enhancing the accuracy of the absolute speed and the absolute azimuth by deriving a position from the relative accuracy per unit time.

Figure 13:
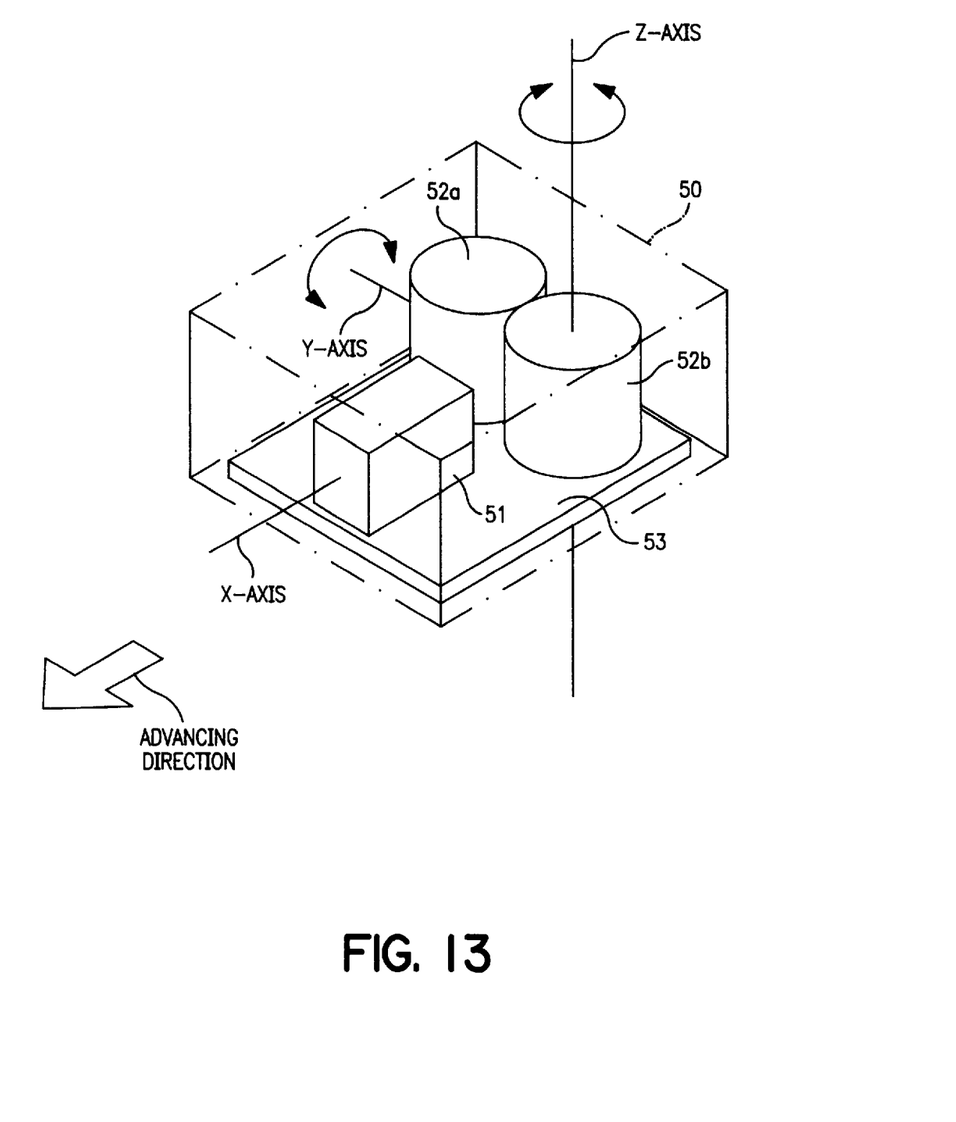
FIG. 13 is an internal perspective view showing a structural example of an inertia sensor according to this embodiment.

As shown in FIG. 13, the inertia sensor 50 includes one accelerometer 51 and two angular speedometers 52*a* and 52*b*. The accelerometer 51 is formed, for example, by semiconductor processes and fixed to a board 53 arranged horizontally in a casing of the inertia sensor 50, located on a horizontal axis (X-axis) extending in traveling directions of the vehicle so as to detect accelerations in the traveling directions of the vehicle (advancing direction, retreating direction). The angular speedometers 52a, 52b are, for example, in the form of vibration gyroscopes, respectively. The first angular speedometer (pitch measuring gyro) 52a is fixed to the board 53 so as to detect an angular velocity about a horizontal axis (Y-axis) orthogonal to the horizontal axis (X-axis) of the accelerometer 51. The second angular speedometer (azimuth measuring gyro) 52b is fixed to the board 53 so as to detect an angular velocity about a vertical axis (Z-axis) orthogonal to the X-axis. The detected acceleration data and angular velocity data are outputted to the arithmetic control section 30 via a cable.

The arithmetic control section 30 includes a digital I/F 35, an analog I/F 36, an external I/F 37, a CPU 38 and a memory 39. The digital I/F 35 receives the digital data from the GPS receiver 2. The analog I/F 36 processes at high speed the analog data (acceleration data, angular velocity data) outputted from the inertia sensor 50, and includes an amplifier and an A/D converter for digitizing an amplified signal.

The CPU 38 is a digital processor and arithmetically processes the angular velocity data and the acceleration data, converted into digital signals by the foregoing analog I/F 36 (A/D converter), according to given programs stored in the memory 39 so as to realize functions of the foregoing speed arithmetic processing section 41, azimuth arithmetic processing section 42 and position arithmetic processing section 43. While the GPS receiver 2 normally receives the GPS signals, the absolute speed and the absolute azimuth inputted via the digital I/F 35 and t he relative s peed and the relative azimuth derived based on the acceleration data and the angular velocity data obtained from the inertia sensor 50 are corrected with the mutual data so as to derive the actual speed and the actual azimuth with high accuracy. The absolute speed can be used as the actual speed as it is.

On the other hand, while the GPS receiver 2 does not receive the GPS signals normally, that is, while the vehicle is in the tunnel so that the waves from the GPS satellites can not be received, the relative speed and the relative azimuth calculated and corrected during the normal reception of the GPS signals are derived as the actual speed and the actual azimuth.

The external I/F 37 is provided for outputting various data obtained through calculation at the foregoing CPU 38 in a manner to match the connected navigation system 60.

Figure 14:
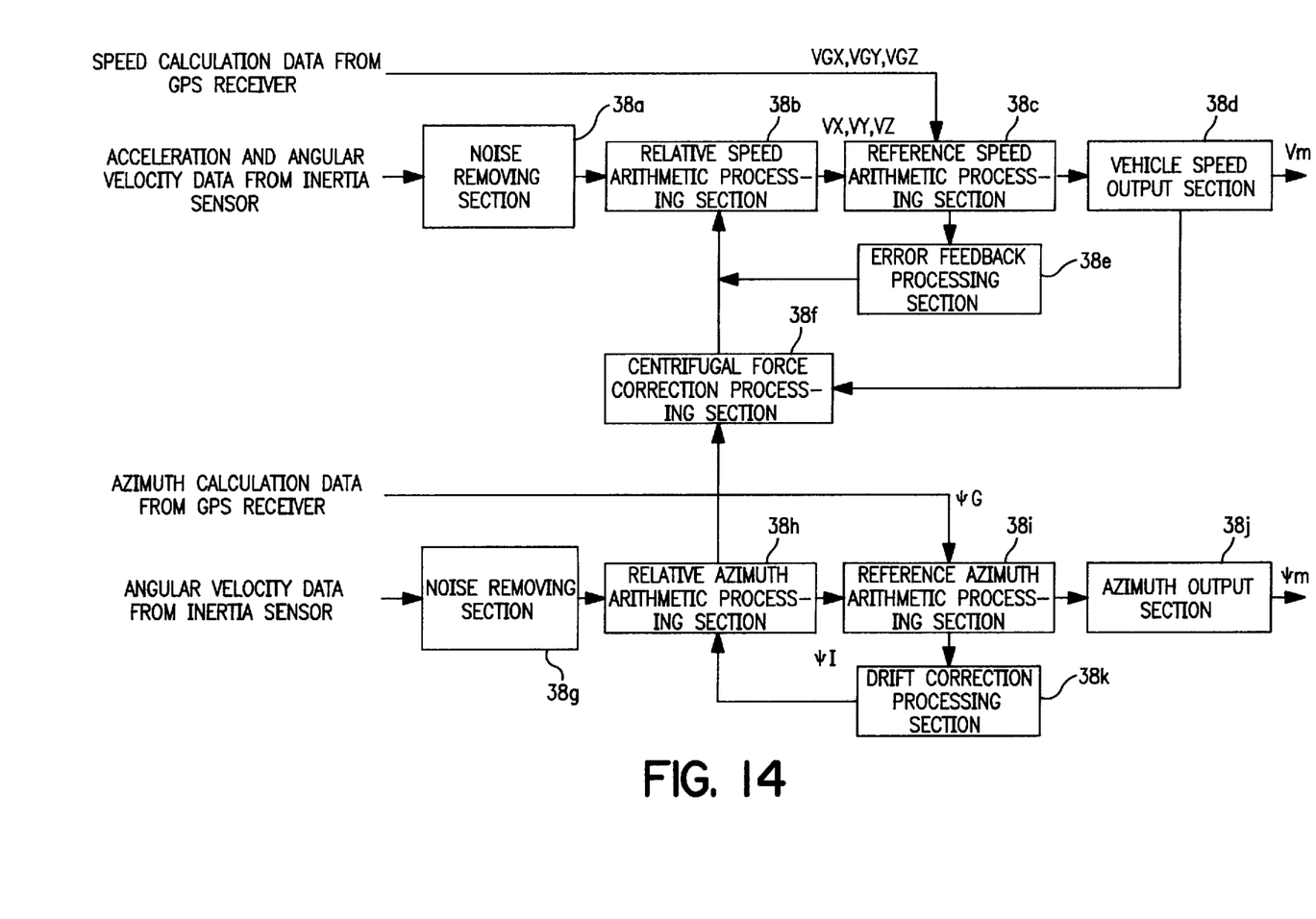
FIG. 14 is a functional block diagram of an arithmetic control section in this embodiment.

Now, a concrete operation of the movement detecting device in this embodiment will be described with reference to FIG. 14.

The acceleration data measured by the accelerometer 51 of the inertia sensor 50 and the angular velocity data from the pitch measuring first angular speedometer 52a are inputted into a noise removing section 38a of the CPU 38 where noise components, such as temperature drift, are removed, and then inputted into a relative speed arithmetic processing section 38b. The relative speed arithmetic processing section 38b derives relative speeds (VX, VY, VZ) and sends them to a reference speed arithmetic processing section 38c. Into the reference arithmetic section 38c are also inputted speed calculation data from the GPS receiver 2, that is, the absolute speeds (VGX, VGY, VGZ).

Figure 15:
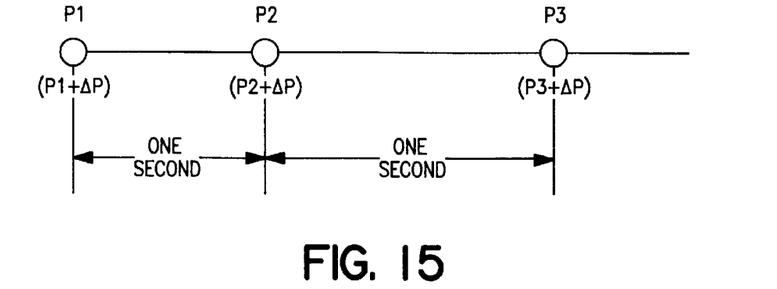
FIG. 15 is a diagram for explaining a calculation process of the absolute position in this embodiment.

As shown in FIG. 15, although the absolute position derived per unit time (one second) includes an error ΔP, since the error ΔP is offset from the absolute position (P1, P2, P3 . . .) measured per unit time like P1+ΔP, P2+ΔP, P3+ΔP . . . , the accuracy can be enhanced. The following equation (5) shows this:

$$VGX(VGY, VGZ)=(P2+\Delta P)-(P1+\Delta P)=P2-P1 \quad (5)$$

Figure 16:
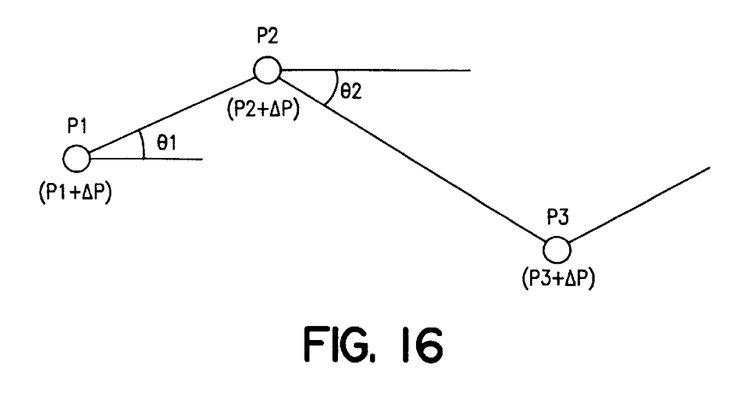
FIG. 16 is a diagram for explaining a calculation process of the absolute azimuth in this embodiment.

On the other hand, the angular velocity data about the Z-axis from the azimuth measuring second angular speedometer 52b is inputted into a noise removing section 38g where noise is removed. Then, a relative azimuth ψI is derived at a relative azimuth arithmetic processing section 38h and sent to a reference azimuth arithmetic processing section 38i. A relative azimuth ψI derived thereby represents a turning angle of the vehicle about the Z-axis. Into the reference azimuth arithmetic processing section 38i is also inputted azimuth calculation data from the GPS receiver 2, that is, the absolute azimuth ψG. As shown in FIG. 16, since the absolute position P derived per unit time (one second) includes an error ΔP, the absolute azimuth ψG derived based on the absolute positions P measured per unit time like P1+ΔP, P2+ΔP, P3+ΔP . . . is given by the following equation (6):

$$\begin{aligned}\psi G &= \arctan(((P2 + \Delta P)y - (P1 + \Delta P)y) \times 1/ \\ &\quad ((P2 + \Delta P)x - (P1 + \Delta P)x) \\ &= \arctan((P2y - P1y) \times 1/(P2x - P1x))\end{aligned} \quad (6)$$

As noted above, since the error ΔP is offset, the highly accurate absolute azimuth ψG can be derived. (P2+ΔP)y represents a Y-direction component of P2+ΔP, and (P2+ΔP)x represents an X-direction component of P2+ΔP. They correspond to the latitude and the longitude on the map, respectively.

The reference speed arithmetic processing section 38c corrects the relative speeds and the absolute speeds derived in the foregoing manner and outputs the result to the car navigation system 60 via a vehicle speed output section 38d the actual speed Vm. On the other hand, the reference azimuth arithmetic processing section 38i corrects the relative azimuth and the absolute azimuth and outputs the result to the car navigation system 60 via an azimuth output section 38j as the actual azimuth ψm.

The corrections performed by the reference speed arithmetic processing section 38c and the reference azimuth arithmetic processing section 38i are as described before.

Specifically, when the normal reception of the GPS signals is possible, the absolute speed derived by the GPS receiver 2 based on the GPS signals as the low-frequency components and the relative speed derived by the relative speed arithmetic processing section 38b based on the data from the inertia sensor 50 as the high-frequency components are combined through the filter. Like the general gyroscopes, the first and second angular speedometers 52a and 52b have a peculiar problem that their angular velocity data as measurement results are subjected to the drift. In view of this, an error feedback processing section 38e performs an accuracy correction of the relative speeds produced at the reference speed arithmetic processing section 38c in a manner to eliminate an influence of the drift.

Figure 17:
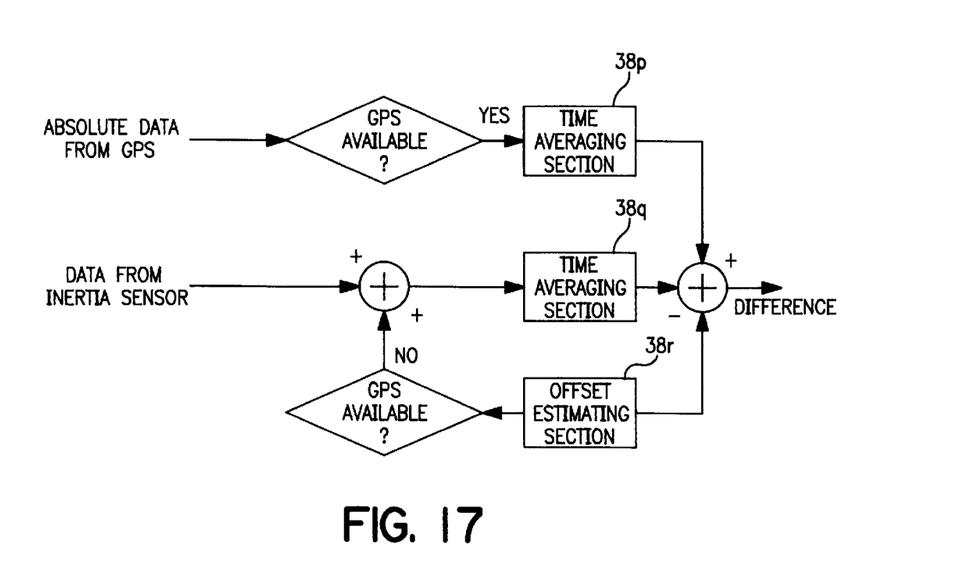
FIG. 17 is a diagram for explaining a correction process in this embodiment.

For example, as shown in FIG. 17, when the normal reception of the GPS signals is possible, the error feedback processing section 38e compares a relative speed time-averaged at a time averaging section 38q and an absolute speed time-averaged at a time averaging section 38p and assumes that a difference therebetween has been caused by a drift of the first angular speedometer (pitch measuring gyro) 52a. A drift of the offset of the first angular speedometer 52a is estimated at an offset estimating section 38r, and the foregoing drift is canceled by the estimated offset to perform the accuracy correction of the relative speed.

Similar correction is performed with respect to the azimuth. Specifically, when the normal reception of the GPS signals is possible, the absolute azimuth derived based on the GPS signals as the low-frequency components and the relative azimuth derived by the relative azimuth arithmetic processing section 38h based on the angular velocity data as the high-frequency components are combined through the filter so as to produce the highly accurate actual azimuth ψm.

Further, when the reception of the GPS signals is possible, a drift correction processing section 38k compares a time-averaged relative azimuth and a time-averaged absolute azimuth and assumes that a difference therebetween has been caused by a drift of the second angular speedometer (azimuth measuring gyro) 52b. A drift of the offset is estimated, and the drift is canceled by the estimated offset so as to perform the accuracy correction of the relative azimuth.

When changing a traveling direction of the vehicle, the vehicle inclines outward due to a generated centrifugal force so that the inertia sensor 50 also inclines similarly. When the vehicle speed is low, the inclination is small so that an influence given to the inertia sensor 50 due to the centrifugal force is relatively small. On the other hand, when the vehicle speed is high, the inclination is increased so that an influence given to the inertia sensor 50 due to the centrifugal force can not be ignored. In view of this, it is preferable to provide a centrifugal force correction processing section 38 between the relative speed arithmetic processing section 38b and the relative azimuth arithmetic processing section 38h. The centrifugal force correction processing section 38 verifies an influence of the centrifugal force from a relationship between the actual speed produced at the reference speed arithmetic processing section 38c and the angular velocity data measured by the second angular speedometer 52b and removes the influence of the centrifugal force from the angular velocity data measured by the first angular speedometer 51a and the acceleration data measured by the accelerometer 51. With this arrangement, the relative speeds free of the influence of the centrifugal force are sent to the reference speed arithmetic processing section 38c so that the accuracy of the actual speed is further enhanced. On the other hand, by deriving in advance through experiments the influence of the centrifugal force between the actual speeds and the angular velocity data measured by the second angular speedometer to prepare a table and by referring to the table to perform the centrifugal force correction, the simplification and speed-up of the processing can be achieved.

As described above, by using the absolute speed and the absolute azimuth as the low-frequency components in case of the slow change of the vehicle and by using the relative speed and the relative azimuth as the high-frequency components in case of the quick change of the vehicle, the highly accurate actual speed and actual azimuth can be outputted.

Further, the correction data for deriving the correct speed and azimuth can be produced during the normal reception of the GPS signals and thus, even when the reception of the GPS signals is not possible, the highly accurate actual speed and actual azimuth can be derived.

Further, since it is not necessary to detect the speed of the vehicle from its tire as in the prior art, it is not necessary to apply a particular structure to the vehicle upon installing the car navigation system. Thus, the limitation can be eliminated upon handling the car navigation, thereby leading to the large expansion of the car navigation. The present invention is applicable not only to the vehicle but also to the other moving objects.

Industrial Applicability

As described above, in the present invention, the differential data between the absolute movement data of the moving object and the relative movement data of the moving object derived from the measured values of the inertia sensor is produced while the GPS signals are normally received. When the reception of the GPS signals becomes disabled, the relative position data is corrected using the differential data so as to produce the actual movement data. Thus, regardless of the receiving conditions of the GPS signals, the actual speed and the actual azimuth can be derived accurately.

Further, since the inertia sensor can acquire the acceleration data and the angular velocity data only by disposing it in the moving object without requiring data from the moving object, such as a vehicle speed pulse signal, it is not necessary to apply a particular alteration to the moving object.

Further, since the influence due to the centrifugal force generated on the moving object or the drift of the inertia sensor can be removed, the further accurate measurement is made possible so that the movement data of the moving object can be produced more accurately.

We claim:

1. A movement detecting device comprising:

GPS arithmetic means for producing first movement data based on GPS signals, said first movement data including variation components of an absolute position, an absolute speed and an absolute azimuth of a moving object;

an inertia sensor for detecting an acceleration generated in a traveling direction of the moving object and an angular velocity generated about an axis having a fixed inclination relative to the traveling direction;

means for producing second movement data from the acceleration and the angular velocity measured by said inertia sensor, said second movement data including variation components of a relative position, a relative speed and a relative azimuth of the moving object; and arithmetic control means for correcting said first and second movement data based on the mutual data and producing actual movement data including an actual position, an actual speed and an actual azimuth of the moving object through calculation, wherein said arithmetic control means comprises a speed arithmetic processing section which comprises:

(1) means for deriving a first motion acceleration (EGX) from a variation of a combined speed obtained through a filter combination of said absolute speed (VGX) and said relative speed (VX), and means for deriving a first gravitational acceleration ($\alpha$) by subtracting the first motion acceleration (EGX) from acceleration data (AX);

(2) means for converting angular data ($\theta$) obtained by integrating angular velocity data (q) into a second gravitational acceleration ($\beta$);

(3) means for converting a third gravitational acceleration (ax) obtained through a filter combination of the first and second gravitational accelerations ($\alpha$, $\beta$) into a fourth gravitational acceleration ($\beta$x) based on a reference inclination;

(4) means for deriving an error ($\epsilon$) between the first gravitational acceleration ($\alpha$) and the fourth gravitational acceleration ($\beta$x); and (5) means for correcting the second gravitational acceleration ($\beta$) by said error ($\epsilon$), deriving a second motion acceleration (EXoff) by subtracting a gravitational acceleration after the correction from the acceleration data (AX), and deriving an actual speed (V) by integrating the second motion acceleration (EXoff).

2. The movement detecting device as set forth in claim 1, characterized in that the filter combination of said absolute speed (VGX) and said relative speed (VX) and the filter combination of said first and second gravitational accelerations ($\alpha, \beta$) are each in the form of a combination of values after passing through two kinds of filters having different frequency bands.

3. A movement detecting device comprising:

GPS arithmetic means for producing first movement data based on GPS signals, said first movement data including variation components of an absolute position, an absolute speed and an absolute azimuth of a moving object;

an inertia sensor for detecting an acceleration generated in a traveling direction of the moving object and an angular velocity generated about an axis having a fixed inclination relative to the traveling direction;

means for producing second movement data from the acceleration and the angular velocity measured by said inertia sensor, said second movement data including variation components of a relative position, a relative speed and a relative azimuth of the moving object; and arithmetic control means for correcting said first and second movement data based on the mutual data and producing actual movement data including an actual position, an actual speed and an actual azimuth of the moving object through calculation, wherein said arithmetic control means comprises an azimuth arithmetic processing section which comprises:

(1) means for deriving a combined relative azimuth ($\psi$) through a filter combination of a variation per unit time of said absolute azimuth ($\psi G$) and said relative azimuth ($\psi I$); and (2) means for selectively outputting one of a first actual azimuth obtained by summing said combined relative azimuth ($\psi$) derived based on the sequentially updated absolute azimuth ($\psi G$) and relative azimuth ($\psi I$) and said absolute azimuth ($\psi G$), and a second actual azimuth obtained by summing said relative azimuth ($\psi I$) and said first actual azimuth.

4. The movement detecting device as set forth in claim 3, characterized in that the filter combination of the variation per unit time of said absolute azimuth ($\psi G$) and said relative azimuth ($\psi I$) is in the form of a combination of values after passing through two kinds of filters having different frequency bands.

5. A movement detecting device comprising:

GPS arithmetic means for producing first movement data based on GPS signals, said first movement data including variation components of an absolute position, an absolute speed and an absolute azimuth of a moving object;

an inertia sensor for detecting an acceleration generated in a traveling direction of the moving object and an angular velocity generated about an axis having a fixed inclination relative to the traveling direction;

means for producing second movement data from the acceleration and the angular velocity measured by said inertia sensor, said second movement data including variation components of a relative position, a relative speed and a relative azimuth of the moving object; and arithmetic control means for correcting said first and second movement data based on the mutual data and producing actual movement data including an actual position, an actual speed and an actual azimuth of the moving object through calculation, wherein said arithmetic control means comprises a position arithmetic processing section which comprises:

(1) means for deriving a moved distance (D) by integrating said actual speed (Vm), and deriving a latitude variation value and a longitude variation value based on said moved distance (D) and said actual azimuth ($\psi m$); and (2) means for producing the actual position (LOGn, LATn) by correcting the sequentially updated absolute position (LOG, LAT) during its non-updated term using said latitude variation value and said longitude variation value.

6. The movement detecting device as set forth in claim 1, characterized in that said arithmetic control means comprises a position arithmetic processing section which comprises:

(1) means for deriving a moved distance (D) by integrating said actual speed (Vm), and deriving a latitude variation value and a longitude variation value based on said moved distance (D) and said actual azimuth ($\psi m$); and (2) means for producing the actual position (LOGn, LATn) by correcting the sequentially updated absolute position (LOG, LAT) during its non-updated term using said latitude variation value and said longitude variation value.

7. The movement detecting device as set forth in claim 3, characterized in that said arithmetic control means comprises a position arithmetic processing section which comprises:

(1) means for deriving a moved distance (D) by integrating said actual speed (Vm), and deriving a latitude variation value and a longitude variation value based on said moved distance (D) and said actual azimuth ($\psi m$); and (2) means for producing the actual position (LOGn, LATn) by correcting the sequentially updated absolute position (LOG, LAT) during its non-updated term using said latitude variation value and said longitude variation value.

* * * * *